US011575651B2

(12) United States Patent
Levin et al.

(10) Patent No.: US 11,575,651 B2
(45) Date of Patent: Feb. 7, 2023

(54) DYNAMICALLY SCALABLE APPLICATION FIREWALL DEPLOYMENT FOR CLOUD NATIVE APPLICATIONS

(71) Applicant: Palo Alto Networks, Inc., Santa Clara, CA (US)

(72) Inventors: Liron Levin, Kefar Sava (IL); Isaac Schnitzer, Ra'anana (IL); Elad Shuster, Petach Tikva (IL); Ory Segal, Tel Aviv (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 116 days.

(21) Appl. No.: 17/139,103

(22) Filed: Dec. 31, 2020

(65) Prior Publication Data
US 2022/0210122 A1 Jun. 30, 2022

(51) Int. Cl.
*H04L 29/06* (2006.01)
*H04L 9/40* (2022.01)
*G06F 9/50* (2006.01)

(52) U.S. Cl.
CPC .......... *H04L 63/0218* (2013.01); *G06F 9/505* (2013.01)

(58) Field of Classification Search
CPC .............................. H04L 63/0218; G06F 9/505
See application file for complete search history.

(56) References Cited

U.S. PATENT DOCUMENTS

| 9,769,085 B2 | 9/2017 | Laribi et al. |
| 2017/0093923 A1* | 3/2017 | Duan .................. G06F 11/2028 |
| 2017/0366605 A1* | 12/2017 | Chang ..................... H04L 49/70 |

OTHER PUBLICATIONS

PCT Application No. PCT/US2021/073133, International Search Report, dated Feb. 25, 2022, 4 pages.
PCT Application No. PCT/US2021/073133, Written Opinion, dated Feb. 25, 2022, 7 pages.

* cited by examiner

*Primary Examiner* — Wasika Nipa
(74) *Attorney, Agent, or Firm* — Gilliam IP PLLC (57) ABSTRACT

A configuration of a cloud application exposed via a public IP address is duplicated with modifications to include a private IP address to expose the application internally. The original configuration is updated so that external network traffic sent to the application is redirected to and distributed across agents running on nodes of a cloud cluster by which web application firewalls (WAFs) are implemented. A set of agents for which the respective WAFs should inspect the redirected network traffic are selected based on cluster metrics, such as network and resource utilization metrics. The redirected network traffic targets a port allocated to the agents that is unique to the application, where ports are allocated on a per-application basis so each of the agents can support WAF protection for multiple applications. Network traffic which a WAF allows to pass is directed from the agent to the application via its private IP address.

20 Claims, 9 Drawing Sheets

DYNAMICALLY SCALABLE APPLICATION FIREWALL DEPLOYMENT FOR CLOUD NATIVE APPLICATIONS

BACKGROUND

The disclosure generally relates to electric digital data processing and to security arrangements for protecting computers, components thereof, programs or data against unauthorized activity.

Attacks which target application layer processes are referred to as application layer attacks. To protect an application against application layer attacks, the application and its application programming interface (API) can be secured through deployment of an application firewall, or in the case of web applications, a web application firewall (WAF). For web applications running in a cloud environment, cloud-based WAFs can be deployed for protection against application layer attacks. Cloud applications differ from traditional software applications in that the applications are hosted in the cloud rather than locally and can be accessed via the Internet. Due to the growing trend towards cloud computing, applications are commonly developed to be cloud native, or designed to be run in a cloud environment. Cloud native applications, which can be composed of loosely coupled services/microservices, are containerized applications designed to be deployed to nodes of a cloud cluster on which the application will run and managed by a container orchestration platform.

Container orchestration platforms generally provide functionality which facilitates exposure of cloud applications either externally (i.e., made accessible to entities outside of the cluster) or internally (i.e., made accessible to entities within the cluster). For instance, a cloud application can be exposed externally through allocation of a public Internet Protocol (IP) address to the group of one or more containers of the cloud application by a cloud provider. Network traffic originating from entities external to the cluster is then routed to the cloud application via the public IP address and load balanced across the cloud application's containers by a load balancer external to the cluster (e.g., a load balancer controlled by the cloud provider). If public exposure is not desired, a cloud application can be made accessible to entities within the cluster through allocation of a private IP address to the group of one or more containers of the cloud application. Load balancing of network traffic originating within the cluster can then be managed by the container orchestration platform itself.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to Transmission Control Protocol (TCP) ports in illustrative examples. Aspects of this disclosure can be instead applied to ports used for other transport layer protocols, such as User Datagram Protocol (UDP) ports. In other instances, well-known instruction instances, protocols, structures and techniques have not been shown in detail in order not to obfuscate the description.

Overview

A technique has been developed to dynamically deploy and scale WAFs across nodes of a cloud cluster with minimum impact on the underlying infrastructure on which containers of cloud native applications (hereinafter "cloud applications" or "applications") run. Scaling of active WAF instances for inspection of traffic directed to an application is automated based on observed conditions within the cluster so that customers need not manage scaling or distribution of WAF instances manually to effectively secure their application. With the solution described herein, WAFs are implemented and instantiated via agents, where an agent runs on each node of the cloud cluster. By dynamically labelling each agent container to indicate the application(s) for which the WAF deployed via the agent should inspect intercepted network traffic based on the observed conditions, such as amount of network traffic and node resource utilization, the number of WAF instances available for each application can be dynamically scaled up or down to accommodate the conditions of the cluster.

After detecting an externally exposed application, a duplicate configuration of the application is generated with modifications to include a private IP address for accessing the application rather than a public IP address such that the application is exposed internally within the cluster. The original configuration by which the application is exposed externally is updated so that network traffic sent to the application from external sources is redirected to and distributed across the agents running on the nodes of the cluster. The agents to which network traffic is to be redirected can be selected and a label which designates the application attached based on measured network traffic directed to the application and/or resource utilization across the available nodes of the cloud cluster. For instance, a higher load may prompt selection and corresponding labelling of all available agents so that network traffic can be distributed across nodes without overwhelming available resources, while a subset of the agents may be selected and labelled if the application is experiencing lower traffic. A unique port is allocated to the agent on which the agent can receive network traffic redirected from the application, where ports are allocated on a per-application basis so that the agent can distinguish between network traffic corresponding to different applications based on a combination of the port number and the labels assigned to the agents. Network traffic which the WAF allows to pass can then be directed to the application from within the cluster via the private IP address which exposes the application internally rather than externally. Because the number of available WAF instances to which network traffic destined for an application can be routed is correlated with application load and resource utilization of the nodes on which the application runs, dynamically scaling WAF instances contributes to conservation of resource utilization within the cluster. Resource utilization is further conserved as a result of leveraging one agent to provide WAF protection for multiple applications running on the node through allocation of ports and labels unique to different applications as opposed to deploying additional agents for additional applications.

Example Illustrations

Figure 1:
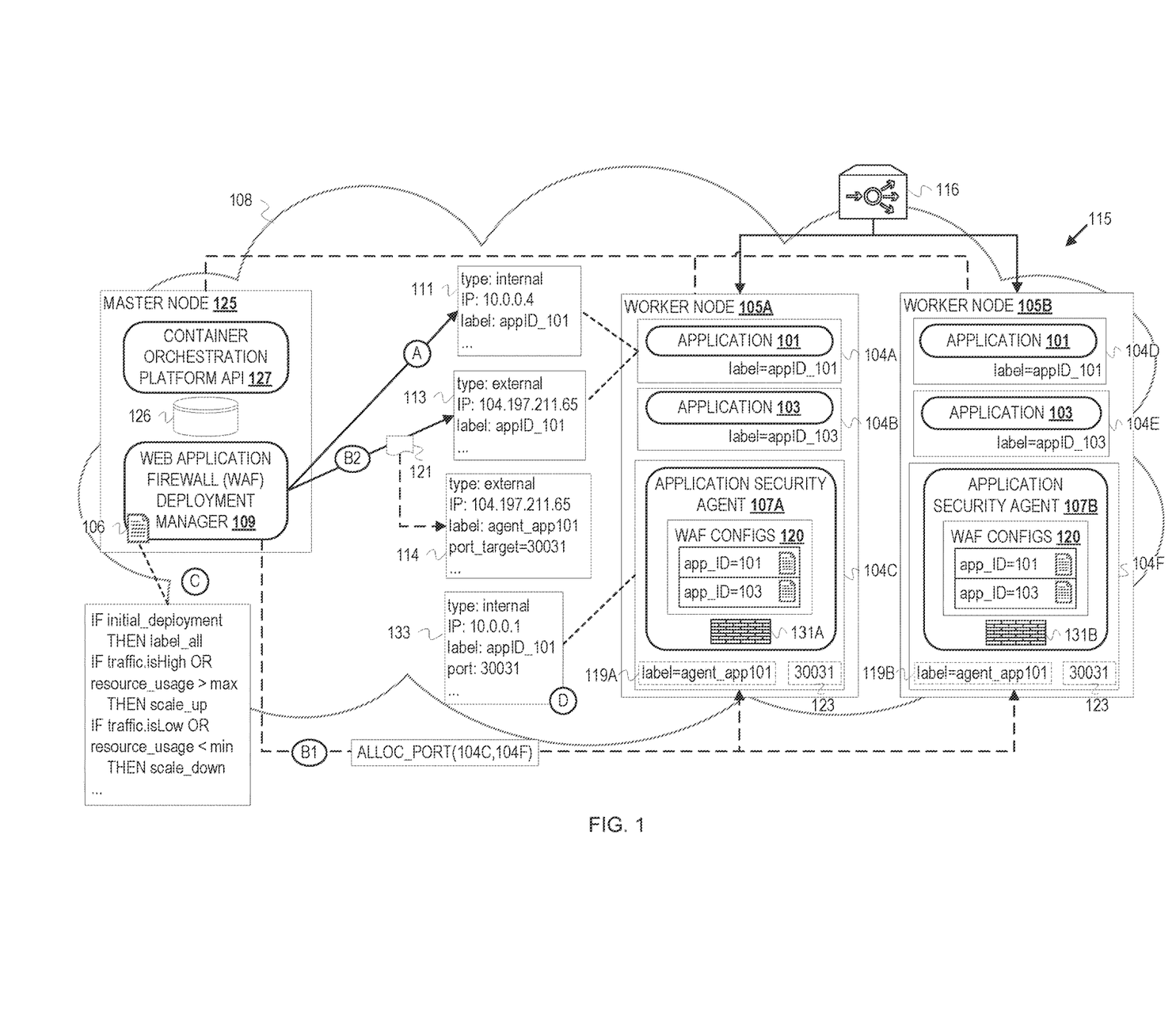
FIG. 1 depicts an example conceptual diagram of dynamically scalable deployment of a WAF to secure an application running in a cloud environment.

FIG. 1 depicts an example conceptual diagram of dynamically scalable deployment of a WAF to secure an application running in a cloud environment. Two replicas each of an application 101 and an application 103 are deployed to a cloud 108 and run on a cluster 115. The applications 101, 103 can be cloud native applications. As used herein, "cloud native application" and "cloud application" refer to a containerized application to be run in a cloud. The cloud 108 may be a public cloud, private cloud, or private cloud offered by a cloud service provider. The cluster 115 includes a worker node 105A and a worker node 105B. The worker nodes 105A, 105B may be physical machines or virtual machines which provide the resources for running containerized applications in the cloud 108 (e.g., a container runtime). A load balancer 116 external to the cluster 115 distributes traffic between the worker nodes 105A, 105B. The load balancer 116 may be an external load balancer controlled by the cloud service provider.

The cluster 115 also includes a master node 125. The master node 125 comprises the components which manage deployment and scheduling of the applications 101, 103 (e.g., control plane components) and configuration of the worker nodes 105A, 105B. The master node 125 also maintains a repository 126 of data for the cluster 115, such as configuration files specifying the configuration for deployment of the applications 101, 103 (e.g., number of replicas). A WAF deployment manager 109 executes on the master node 125. The WAF deployment manager 109 manages deployment and scaling of WAF instances within the cluster 115, where WAFs are deployed via application security agents ("agents") that execute on each of the worker nodes 105A, 105B. Specifically, an agent 107A executes on the worker node 105A and an agent 107B executes on the worker node 105B. The agents 107A, 107B can communicate with the master node 125 via an API 127 of the container orchestration platform exposed to the worker nodes 105A, 105B by the master node 125.

In this example, the agents 107A, 107B are deployed to the respective one of the worker nodes 105A, 105B as containerized applications. Each instance of the applications 101, 103 and agents 107A, 107B is packaged in a respective container. On the worker node 105A, the applications 101, 103 and agent 107A are packaged in container 104A, container 104B, and container 104C, respectively. On the worker node 105B, the applications 101, 103 and agent 107B are packaged in container 104D, and container 104E, and container 104F, respectively. The containers 104A-F each comprise program code of the respective one of the applications 101, 103 or agents 107A, 107B, libraries used by the respective ones of the applications 101, 103 or agents 107A, 107B, etc. A container orchestration platform manages container orchestration for the containers 104A-I by which applications 101, 103 and agents 107A, 107B are deployed.

A WAF 131A is instantiated via the agent 107A, and a WAF 131B is instantiated via the agent 107B. The WAFs 131A, 131B can be implemented as part of the functionality of the respective one of the agents 107A, 107B (e.g., as a process that executes as part of each of the agents 107A, 107B). The WAFs 131A, 131B can inspect network traffic redirected from applications running on the cluster 115 based on WAF configurations 120 attached to (i.e., installed on or otherwise accessible to) the agents 107A, 107B for each application to be secured. The WAF configurations 120 indicate the applications which the WAFs 131A, 131B can secure and the corresponding rules or policies based on which intercepted network traffic will be evaluated. The WAFs 131A, 131B each can thus support protection of multiple applications by determining the application for which network traffic is destined and selecting the corresponding set of rules or policies maintained in the WAF configurations 120 to apply for inspection of the network traffic.

FIG. 1 is annotated with a series of letters A-D. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, based on detecting that the application 101 is externally exposed, the WAF deployment manager 109 generates a modified configuration 111 for the application 103 to expose the application 101 internally within the cluster 115. Externally exposed applications are those which directly receive network traffic from external entities, such as based on the load balancer 116 directing traffic to the application. A configuration 113 for deployed instances of the application 101 specifies that the type of the application 101 is "external" and includes a public IP address by which the application 101 can be accessed, indicating that the application 101 receives network traffic from external entities. The configuration 113 also indicates that received network traffic should be routed to containers labelled as "appID_101," which corresponds to the containers 104A, 104D. The WAF deployment manager 109 can detect that the application 101 is externally exposed by identifying the application 101 as running on the cluster 115 and analyzing a type field, IP address field, etc. of the configuration 113. The WAF deployment manager 109 may retrieve the configuration 113 for analysis from the repository 126 maintained for the cluster 115. The WAF deployment manager 109 then generates the modified configuration 111 by duplicating the configuration 113 but replacing the public IP address indicated in an address field with a private IP address allocated to the application 101 to expose the application 101 internally. As a result, the application 101 is exposed both externally as designated by the configuration 113 and internally as designated by the modified configuration 111.

At stage B, the WAF deployment manager 109 configures the entities within the cluster 115 to redirect network traffic destined for the application 101 to the agents 107A, 107B. Network traffic is redirected to and distributed (e.g., internally load balanced) across the agents 107A, 107B for inspection by the respective one of the WAFs 131A, 131B.

The operations which occur at Stage B are described as including two substages, stage B1 and stage B2, for clarity. However, the order of the substages and/or operations performed therein can vary among implementations.

At stage B1, the WAF deployment manager 109 allocates a port 123 to the agents 107A, 107B on which application 101 traffic will be delivered. The WAF deployment manager 109 allocates a port (e.g., a TCP port), depicted in FIG. 1 as port number 30031, to the agents 107A, 107B. The port 123 may be allocated on an IP address of the containers 104C, 104F corresponding to the agents 107A, 107B. The WAF deployment manager 109 allocates the port 123 to the agents 107A, 107B such that the port number is unique to the application 101—that is, the WAF deployment manager 109 allocates ports on a per-application basis so that the agents 107A, 107B can identify the application for which data received on a port is destined.

At stage B2, the WAF deployment manager 109 modifies the configuration 113 to generate a modified configuration 114 for the externally exposed application 101 such that traffic destined for the application 101 will be redirected to the agents 107A, 107B and target the port 123. The WAF deployment manager 109 generates an update 121 to the configuration 113 which replaces a label and port associated with containers of the application 101 with a label to be assigned to agent containers and the port 123. In the modified configuration 114 that results from the update, the label "appID_101" and targeted port associated with the application 101 are replaced with the name of a label to be assigned to agent containers to which application 101 traffic will be redirected, depicted as "agent_app101," and the port 123 as a target port. As a result of generating the modified configuration 114 that indicates the port 123 and label corresponding to containers of the deployed agents rather than those of the application 101, load balanced traffic originating external to the cluster 115 having the destination address of the application 101 will be redirected to and distributed across (e.g., internally load balanced across) containers having the label "agent_app101" and target TCP port 30031.

At stage C, the WAF deployment manager 109 determines a set of one or more agents to which application 101 traffic should be redirected for WAF inspection and assigns a label that matches the label listed in the modified configuration 114 to the corresponding container(s). The WAF deployment manager 109 can determine the set of agents based on WAF deployment policies ("policies") 106 for deploying and scaling WAFs that should be available for applications running on the cluster 115. Labelling containers corresponding to agents via which WAFs are implemented based on the policies 106 allows the WAF deployment manager 109 to scale a number of active WAF instances available to an application based on various criteria, such as node resource usage metrics, network metrics, etc. In this example, the policies 106 indicate that upon initial WAF deployment for an application, each of the agent containers should be labelled with the label corresponding to the application. The WAF deployment for the application 101 is an initial deployment, so the WAF deployment manager 109 assigns labels 119A, 119B to the respective containers 104C, 104F. The WAF deployment manager 109 can assign the labels 119A, 119B by updating a configuration 133 of the agents 107A, 107B to indicate the labels for each of the agents' containers, or the containers 104C, 104F (e.g., by adding or updating a label field of the configuration file for the agents 107A, 107B).

At stage D, the WAF deployment manager 109 updates a configuration 133 of the agents 107A, 107B so that traffic received on the port 123 and allowed to pass by a respective one of the WAFs 131A, 131B is directed to the application 101 via its private IP address indicated in the modified configuration 111. Upon its update, the configuration 133 indicates that data received by the agents 107A, 107B on TCP port 30031, or the port 123, should next be directed to containers labelled with "appID_101," or the containers 104A, 104D, via their private IP address. Because two configurations were generated for the application 101, where a first of the configurations exposes the application 101 externally and dictates that external traffic should be redirected to the agents 107A, 107B and a second of the configurations exposes the application 101 internally (i.e., the modified configuration 114 and modified configuration 111, respectively), the WAFs 131A, 131B act as a "man in the middle" deployed between the external exposure of the application 101 and the internal exposure of the application 101.

Because the modified configuration 114 for externally exposing the application 101 indicates that traffic received from the load balancer 116 should be directed to containers labelled as "agent_app101" and the containers 104C, 104F were labelled accordingly, traffic sent from entities external to the cluster 115 that is destined for the application 101 will be redirected to the agents 107A, 107B for inspection by respective WAFs 131A, 131B. The agents 107A, 107B can differentiate between intercepted traffic having different destination addresses (i.e., IP addresses of the applications 101, 103) because redirected network traffic for each application will be received on a port which is distinct to the destination application. For instance, redirected application 101 traffic will target TCP port 30031, while redirected application 103 traffic will target a different port. The WAFs 131A, 131B can therefore determine which of the rules, policies, etc. maintained for different applications in the WAF configurations 120 to apply upon receipt of redirected traffic for inspection based on the port on which the traffic was delivered. Maintaining multiple sets of WAF rules or policies for securing different applications running on the cluster 115 that can be selectively applied for evaluation of intercepted traffic allows each of the agents 107A, 107B to support deployment of a single WAF instance for protection of multiple applications per WAF.

Figure 2:
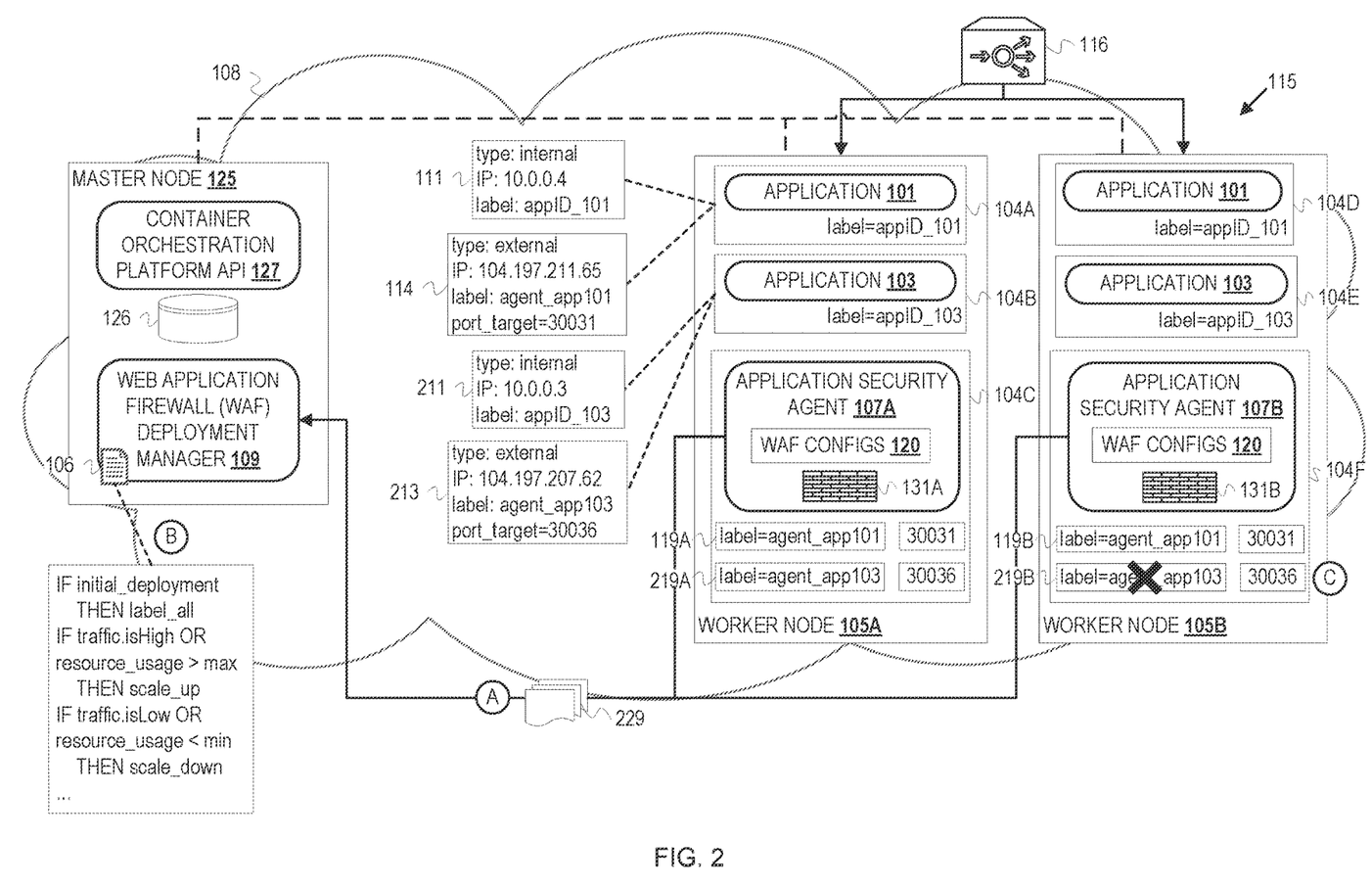
FIG. 2 depicts an example conceptual diagram of dynamically scaling deployed WAF instances available for securing a cloud application based on observed conditions within a cluster on which the cloud application runs.

FIG. 2 depicts an example conceptual diagram of dynamically scaling deployed WAF instances available for securing a cloud application based on observed conditions within a cluster on which the cloud application runs. FIG. 2 depicts the cluster 115 comprising the worker nodes 105A, 105B to which agents 107A, 107B are deployed and master node 125 of FIG. 1. In this example, the WAFs 131A, 131B secure both the application 101 and the application 103 based on evaluating incoming network traffic against rules, policies, etc. indicated in the WAF configurations 120 corresponding to the application for which the traffic is destined. As depicted in FIG. 1, the agents 107A, 107B are designated for receiving network traffic redirected from the application 101 on TCP port 30031 based on the labelling with the labels 119A, 119B. The agents 107A, 107B are also labelled with a respective label 219A and label 219B, depicted as "agent_app103," to indicate that application 103 traffic is to be redirected to the agents 107A, 107B and target TCP port 30036. Similar to the application 101, a configuration 213 indicating the labels 219A, 219B and TCP port 30036 specifies that the application 103 is externally exposed, and a modified configuration 211 generated based on the configuration 213 as described in reference to FIG. 1 also exposes the application 103 internally.

FIG. 2 is annotated with a series of letters A-C. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the WAF deployment manager obtains cluster metrics 229 from the agents 107A, 107B. The agents 107A, 107B can monitor network traffic and/or resource usage of the worker nodes 105A, 105B (e.g., memory and central processing unit (CPU) usage) and collect associated metrics. The cluster metrics 229 comprising the network metrics and/or node resource usage metrics collected by the agents 107A, 107B may be periodically reported to or requested by the WAF deployment manager 109, such as at scheduled time increments, upon update events to the cluster 115 (e.g., node addition/failure events), etc. The cluster metrics 229 may include node identifiers (IDs) and application IDs to indicate the node and/or application to which collected metrics correspond.

At stage B, the WAF deployment manager 109 evaluates the cluster metrics 229 based on the policies 106 to determine whether a number of WAF instances for the application 101 or application 103 should be modified to accommodate conditions of the cluster 115. The policies 106 in this example indicate that WAF instances available to an application should be scaled up to accommodate high network traffic, such as if any of the network metrics corresponding to the application or resource usage metrics for a node on which the application runs exceed a threshold(s). The policies 106 also indicate that WAF instances available to an application should be scaled down based on low network traffic or low resource usage for a node on which the application runs, such as if any of the network metrics or resource usage metrics pertaining to the application are below a minimum allotted value. The WAF deployment manager 109 can evaluate the metrics collected for each application based on the policies 106 to determine whether the WAF instances active in the cluster 115 should be "rebalanced" through labelling to redistribute network traffic among nodes. The policies 106 may also indicate increments for number of WAF instances to add or remove based on satisfaction of a policy, such as based on a degree to which collected metrics exceed or are below thresholds indicated in the policies 106.

At stage C, the WAF deployment manager 109 determines that the WAF instances available for the application 103 should be decreased and removes the label 219B from the container 104F. The WAF deployment manager 109 can determine that the WAF instances for the application 103 should be scaled down based on the application 103 receiving low network traffic and the worker node 105B nearing its maximum allotted CPU or memory usage, for example. The WAF deployment manager 109 thus removes the label 219B from the container 104F so that the agent 107B no longer designates the application 103. As a result, application 103 traffic will no longer be redirected to the WAF 131B executing on the agent 107B for inspection. The WAF deployment manager 109 may remove the label 219B by generating an update to a configuration of the agents 107A, 107B to remove the label "agent_app103" from the container 104F. The WAF deployment manager 109 can thus dynamically scale a number of WAF instances deployed via agents running on cluster 115 nodes that are available for securing an application according to collected metrics with minimal to no impact on the infrastructure of the cluster 115 or other applications running on the cluster 115.

Figure 3:
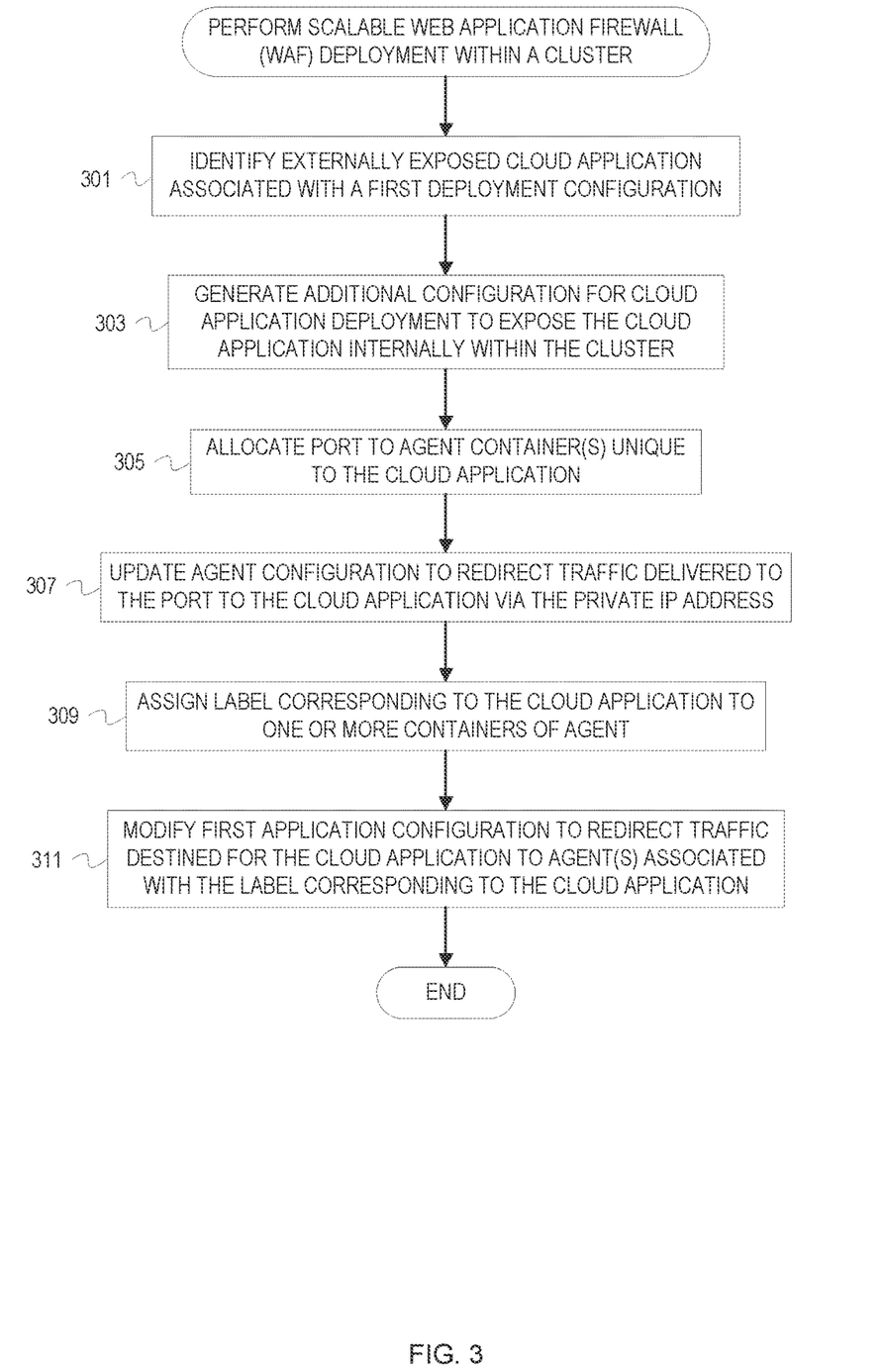
FIG. 3 depicts a flowchart of example operations for performing scalable WAF deployment for a cloud application running on a cluster.
Figure 4:
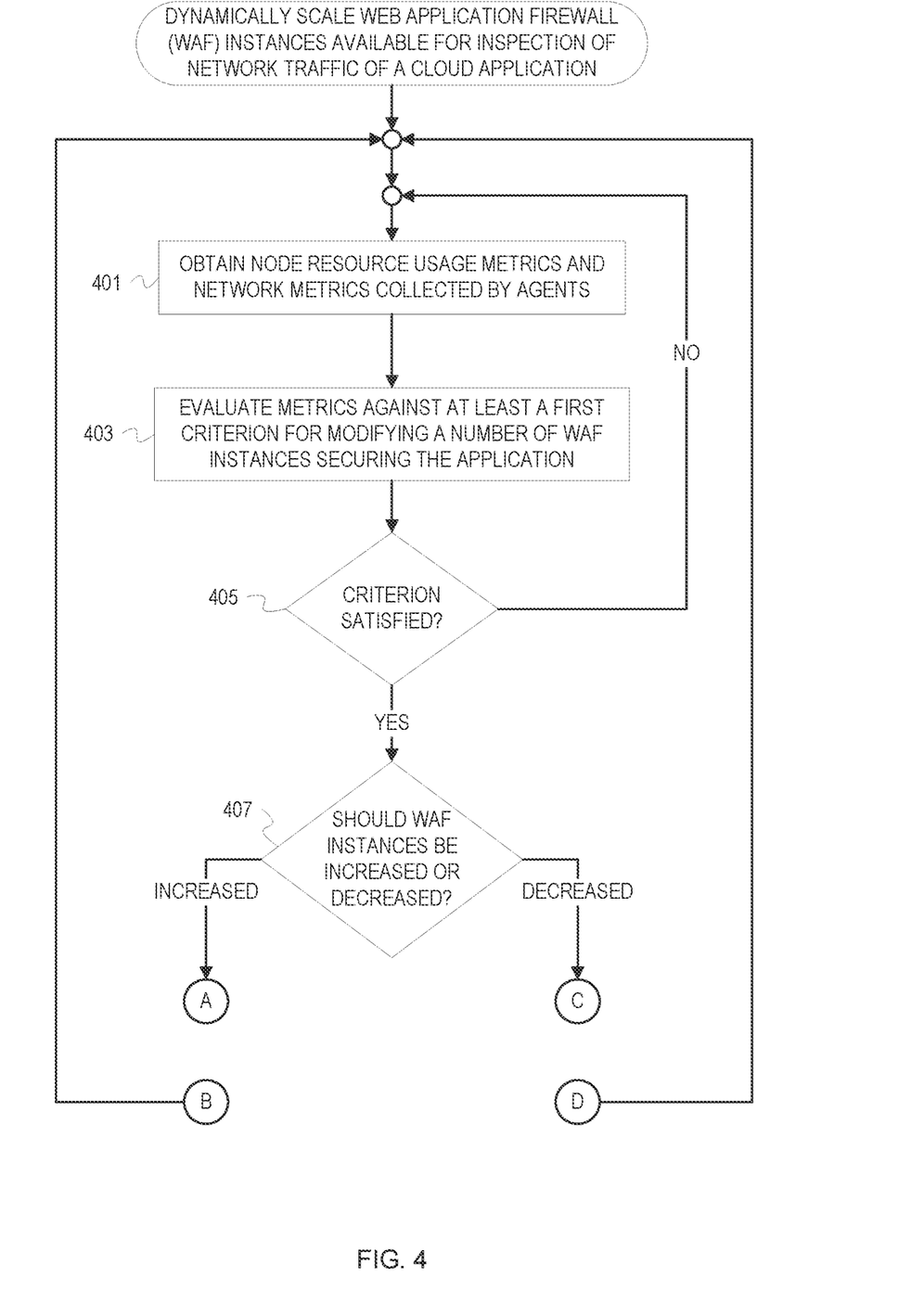
FIGS. 4-5 depict a flowchart of example operations for dynamically scaling WAF instances available for inspection of network traffic for a cloud application across cluster nodes.
Figure 5:
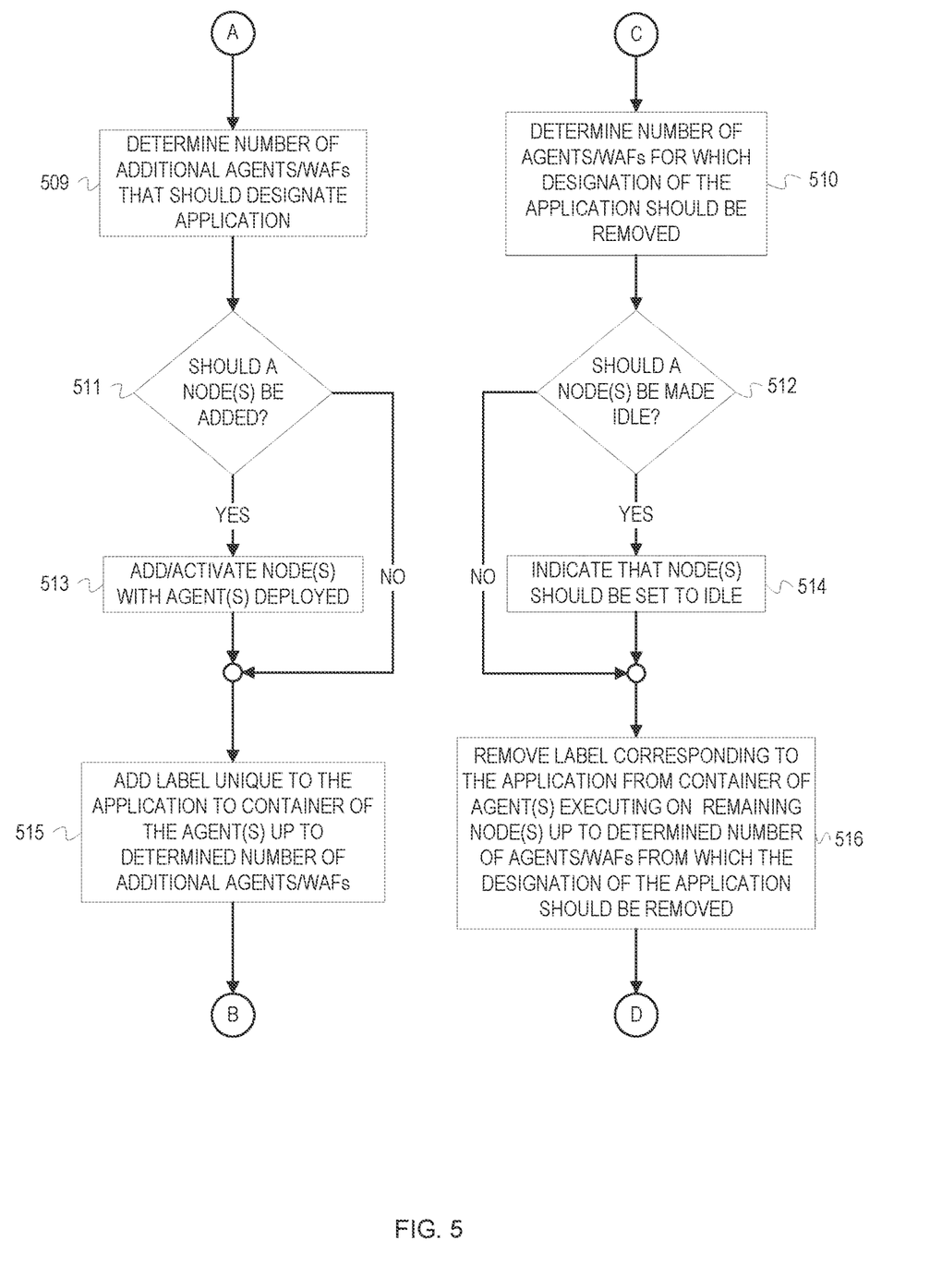

FIGS. 3-5 depict flowcharts of example operations for automated deployment and scaling of WAF instances active for a cloud application running on a cluster based on monitored conditions of the cluster. The example operations are described with reference to a WAF deployment manager for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 depicts a flowchart of example operations for performing scalable WAF deployment for a cloud application running on a cluster. WAF deployment is said to be scalable because WAF instances for inspecting network traffic destined for a cloud application being secured can be made available or unavailable based on labelling containers of agents on which the WAFs are implemented rather than re-deploying the application and/or existing agents executing on the one or more nodes of the cluster. The description of FIG. 3 assumes that an agent, by which a WAF can be implemented, is deployed on each of the one or more nodes of the cluster on which applications can run. In addition to securing applications via a WAF, the agents deployed on the nodes can monitor network traffic and node resource usage and collect associated network metrics and node resource usage metrics during execution of applications running on the cluster.

At block 301, the WAF deployment manager identifies an externally exposed cloud application associated with a first deployment configuration. The WAF deployment manager can identify the cloud application as being externally exposed (i.e., to a load balancer external to the cluster) based on analyzing configuration files accessible to the WAF deployment manager that indicate exposure of applications running on the cluster. For instance, applications can be exposed externally based on allocation of a public IP address by a cloud provider managing the load balancer. The WAF deployment manager can analyze a type field, IP address field, etc. of one or more configuration files specifying deployment configuration for applications running on the cluster and identify the externally exposed cloud application based on its configuration file(s) having fields indicating a type of "external," a public IP address, etc.

At block 303, the WAF deployment manager generates an additional configuration for deployment of the cloud application to expose the cloud application internally within the cluster. The WAF deployment manager can copy the configuration file(s) indicating the external exposure of the cloud application, allocate a private IP address to the cloud application, and replace the public IP address with the private IP address in the resulting additional configuration file(s). The duplication of the first configuration file(s) to generate the additional configuration file(s) results in two IP addresses by which the cloud application is exposed: a public IP address which exposes containers of the cloud application to entities external to the cluster, and a private IP address which exposes containers of the cloud application to entities within the cluster.

At block 305, the WAF deployment manager allocates a port to one or more containers of agents running on nodes of the cluster that is unique to the cloud application. The agent(s) may be deployed as a containerized application associated with its own IP address to expose the agent(s)

internally. The WAF deployment manager allocates the port on the agent IP address that is unique to the cloud application so that ports are allocated to the agent containers on a per-application basis.

At block 307, the WAF deployment manager updates a configuration of the agents to redirect traffic delivered to the port to the cloud application via the private IP address allocated the cloud application. The WAF deployment manager can generate an update to the configuration of the agents to specify that network traffic received on the allocated port should be directed to the cloud application via the private IP address of the cloud application indicated in the configuration for internally exposing the cloud application. For instance, the update to the agent configuration can indicate the allocated port as the port on which the agents are exposed in the cluster. The update to the agent configuration can also designate the container(s) packaging the cloud application as a destination for outgoing network traffic based on the private IP address of the cloud application and/or application-specific label(s) assigned to the agents. The WAF deployment manager may also create one or more iptables rules for network traffic received on the port to direct the traffic to the cloud application via its private IP address.

At block 309 the WAF deployment manager assigns a label corresponding to the cloud application to one or more containers of the agent. The label is a label unique to the cloud application that can be added or attached to containers packaging the agents (e.g., as an attribute or other container metadata). Labels can be used in the cluster to identify or distinguish between containers based on their type/contents, such as to identify the application packaged in a container. Configurations for application/agent deployments can also leverage labels to control the containers to which network traffic is routed, such as to identify a subset of containers associated with an IP address to which network traffic should be directed. Labelling of agents thus facilitates identifying the set or subset of agents running on nodes of the cluster and having a WAF instantiated to which network traffic destined for the cloud application should be redirected for inspection by the WAF. The WAF deployment manager can maintain rules, policies, etc. for assigning labels and assigns a label unique to the cloud application to one or more agent containers based on the rules or policies (e.g., by updating the agent configuration file(s)). For instance, labels can be assigned to each of the containers of the agents in the cluster by default, or upon the first identification of an externally exposed application and subsequent WAF deployment. As is further described in FIG. 4, labels can be dynamically redistributed to increase or decrease the number of WAF instances which should be available for inspecting application traffic across nodes of the cluster to accommodate observed amount of network traffic and/or node resource usage.

At block 311, the WAF deployment manager modifies the first application configuration to redirect network traffic destined for the cloud application to the one or more agents associated with the label corresponding to the cloud application. The WAF deployment manager can generate an update to the configuration file(s) for deployment of the cloud application which specifies that network traffic originating external to the cluster having a destination address corresponding to the cloud application should be redirected to containers having the label corresponding to the cloud application and target the allocated port (e.g., based on updating/adding a label field and target port field which can replace the values associated with containers of the application). As a result, the agents will effectively intercept network traffic sent to the cloud application for inspection by a WAF instantiated for the cloud application. Because different ports and labels are allocated and assigned to agents for different applications, upon receipt of redirected network traffic, the agents and corresponding WAF implementation will subsequently determine the associated application based on the port number on which the traffic was delivered and the labelling of the containers. The WAF can then apply the policies, rules, etc. defined for the cloud application and maintained by the agent for inspection of the network traffic accordingly.

FIGS. 4-5 depict a flowchart of example operations for dynamically scaling WAF instances available for inspection of network traffic of a cloud application (hereinafter the "application") across cluster nodes. The example operations assume that a WAF is instantiated for securing an application via an agent executing on each of one or more nodes of a cluster on which the application runs. The WAF can be instantiated for the application via each agent based on each of the agents implementing the functionality of a WAF and maintaining WAF rules, policies, etc. designating or corresponding to the application. The agents are also configured to intercept network traffic destined for the application for inspection by the respective WAF as described in reference to FIG. 3.

At block 401, the WAF deployment manager obtains node resource usage metrics and network metrics collected by the agents. During execution of the application in the cloud, the agents can monitor network traffic sent to the application and resource usage (e.g., CPU and memory usage) by cluster nodes. The WAF deployment manager can periodically poll or receive updates from the agents to obtain the collected node resource usage metrics and network metrics (e.g., bandwidth, congestion, latency, etc.). Retrieval of collected metrics by the WAF deployment manager may be performed according to a schedule and/or upon updates within the cluster which trigger a collection event, such as node failure events. The WAF deployment manager can determine the metrics pertinent to the application within those obtained, such as the network metrics collected based on application traffic and resource usage metrics for the node(s) to which the application is currently deployed, based on an identifier(s) of the application.

At block 403, the WAF deployment manager evaluates the obtained metrics against one or more criteria for modifying a number of WAF instances with which to secure the application. Evaluation of collected metrics can be performed upon collection of metrics or periodically after defined increments of time, numbers of collection events, etc. Modifying the number of WAF instances for an application refers to increasing or decreasing a number of agents across nodes within the cluster having instantiated a WAF which designate the application via labelling of the respective agent's container with a label unique to the application. A greater number of agents/WAFs may designate an application if the application experiences high network traffic and/or runs on a node(s) that is nearing or surpassing its maximum allotted resource usage so that network traffic destined for application can be distributed across a greater number of WAFs for inspection, thus preventing bottlenecks. A lower number of agents/WAFs may designate an application if the application experiences lower network traffic and/or runs on nodes that are not near capacity to conserve resource usage by consolidating network traffic to a minimum number of active nodes. The criteria can include distinct criteria for both increasing and decreasing the number of agents/WAFs which designate the application based on thresholds for maximum or minimum values of the network metrics and node resource usage metrics. For instance, the criteria may indicate that if resource usage for one or more nodes on which the application runs and/or amount of network traffic received by the application (e.g., in terms of bandwidth, congestion, latency, etc.) exceeds at least a first threshold, the number of agents/WAFs which designate the application should be increased. The criteria may also indicate that if resource usage for one or more nodes on which the application runs and/or amount of network traffic received by the application are below at least a first minimum value, the number of agents/WAFs which designate the application should be decreased.

At block 405, the WAF deployment manager determines if at least a first of the criteria is satisfied. The WAF deployment manager may determine that a first of the criteria was satisfied if one or more of the collected metrics exceeds a threshold corresponding to a maximum value or is below a threshold corresponding to a minimum value. If none of the criteria were satisfied, operations continue at block 401. If at least a first criterion was satisfied, operations continue at block 407.

At block 407, the WAF deployment manager determines if the number of WAF instances which designate the application should be increased or decreased. The determination can be made based on which of the criteria was/were satisfied based on evaluation of the obtained metrics. For instance, it can be determined that the number of WAF instances designating the application should be increased if an obtained metric(s) exceeded a threshold corresponding to a maximum value or decreased if an obtained metric(s) was below a minimum allotted value. If the number of WAF instances should be increased, operations continue to transition point A, which continues at block 509 of FIG. 5. If the number of WAF instances should be decreased, operations continue to transition point C, which continues at block 510 of FIG. 5.

At block 509, the WAF deployment manager determines a number of additional agents and respective WAF instances that should designate the application. The WAF deployment manager may maintain additional criteria, rules, etc. for determining how many additional WAFs should be made available to the application based on the obtained metrics exceeding one or more thresholds. For instance, the additional criteria can indicate that one additional WAF instance should be made available by default and/or can indicate the number of additional instances based on a degree to which the obtained metrics satisfied the initial criteria (e.g., exceeded one or more thresholds). As an example, the additional criteria can indicate the quantity of additional WAFs to be made available if the obtained metric(s) which exceeded the threshold(s) was 1-10% greater than the threshold, 11-20% greater than the threshold, etc.

At block 511, the WAF deployment manager determines if one or more nodes should be added or made active in the cluster. The WAF deployment manager may determine that additional nodes should be added or made active to accommodate the scaling up of the WAFs designating the application. For instance, if the number of currently active nodes is less than the sum of the nodes for which the corresponding agent/WAF already designates the application and the determined number of additional WAF instances that should designate the application, the WAF deployment manager may determine that a node should be added or made active to accommodate the scaling up. As an example, if a cluster includes five nodes and respective agents/WAFs executing thereon and four of the agents/WAFs already designate the application, additional nodes should be added/activated if the determined number of additional WAF instances is two or greater. If a node(s) should be added, operations continue at block 513. If additional nodes need not be added, operations continue at block 515.

At block 513, the determined number of nodes having an agent deployed are added to or made active in the cluster. The WAF deployment manager can communicate a command or request to the cloud service provider (e.g., via an API offered by the cloud service provider) to provision an additional node and deploy an agent to the new node or to change the status of an idle node already having an agent deployed to active/available. The WAF deployment manager may additionally request permission (e.g., from an administrator) prior to having additional nodes added to the cluster or changing a status of idle nodes to active/available.

At block 515, the WAF deployment manager adds a label unique to the application to a container of the additional agent(s) up to the determined number of additional WAF instances that should designate the application. The application-specific label may also be/have been included in a configuration(s) indicating external exposure of the application as a value of a label field which designates that network traffic sent to the IP address associated with the application should be directed to the container(s) that have been labelled accordingly. The label unique to the application that is added to the container(s) of the additional agent(s) should thus match the label indicated in the application configuration(s) so that network traffic having the public IP address of the application as a destination address is redirected to containers of the agent having the indicated label. The label can be added to the agent container(s) through generation of an update to a configuration of the agents, where the update may include one or more container IDs to designate the container(s) to which the label should be added. Operations continue at transition point B, which continues at block 401 of FIG. 4.

At block 510, the WAF deployment manager determines a number of agents and respective WAF instances for which the designation of the application should be removed. Removing the designation of the application from a WAF instance makes the WAF unavailable to the application and can include removing a label unique to the application from a container of the corresponding agent or making idle a node on which the WAF and corresponding agent execute. The WAF deployment manager may maintain additional criteria, rules, etc. for determining how many WAFs should be made unavailable to the application based on the obtained metrics failing to meet one or more minimum values. For instance, the additional criteria can indicate that one WAF instance should be made unavailable by default and/or can indicate the number of instances to be made unavailable based on a degree to which the obtained metrics satisfied the initial criteria (e.g., were below one or more minimum values). As an example, the additional criteria can indicate numbers of WAFs to be made unavailable if the metric(s) which was below the threshold(s) was 1-10% less than the threshold, 11-20% less than the threshold, etc.

At block 512, the WAF deployment manager determines if one or more nodes in the cluster should be made idle. The WAF deployment manager may determine that a node should be made idle to accommodate the scaling down of the WAFs which designate the application if a node no longer need remain active upon removal of the designation of the application from the WAF/agent executing on that node. Scaling down of the application may accompany scaling down of the WAFs designating the application. For example, if the application and agent are the only containerized applications running on a node and the application and WAFs are both to be scaled down, the WAF deployment manager can determine that the node should be made idle as part of decreasing the number of WAFs available to the application to conserve resources in the cluster. If a node(s) should be made idle, operations continue at block 514. If a node(s) should not be made idle, operations continue at block 516.

At block 514, the WAF deployment manager indicates that the determined number of nodes should be set to idle. The WAF deployment manager can communicate a command or request to the cloud service provider (e.g., via an API offered by the cloud service provider) which identifies the node(s) to change the status of the node(s) from active/available to idle. Setting the status of a node to idle also makes the WAF instantiated via the agent executing on the node unavailable to the application.

At block 516, the WAF deployment manager removes a label corresponding to the application from a container on the agent(s) executing on nodes not set to idle up to the remaining number of WAF instances from which to remove the designation of the application. The label may be removed from the agent container(s) through generation of an update to a configuration of the agents, where the update may include one or more container IDs to designate the container(s) from which the label should be removed. The update may also indicate an ID associated with the application associated with the label to identify the label to be removed since agent containers can carry multiple labels corresponding to different applications. Operations continue at transition point D, which continues at block 401 of FIG. 4.

Figure 6:
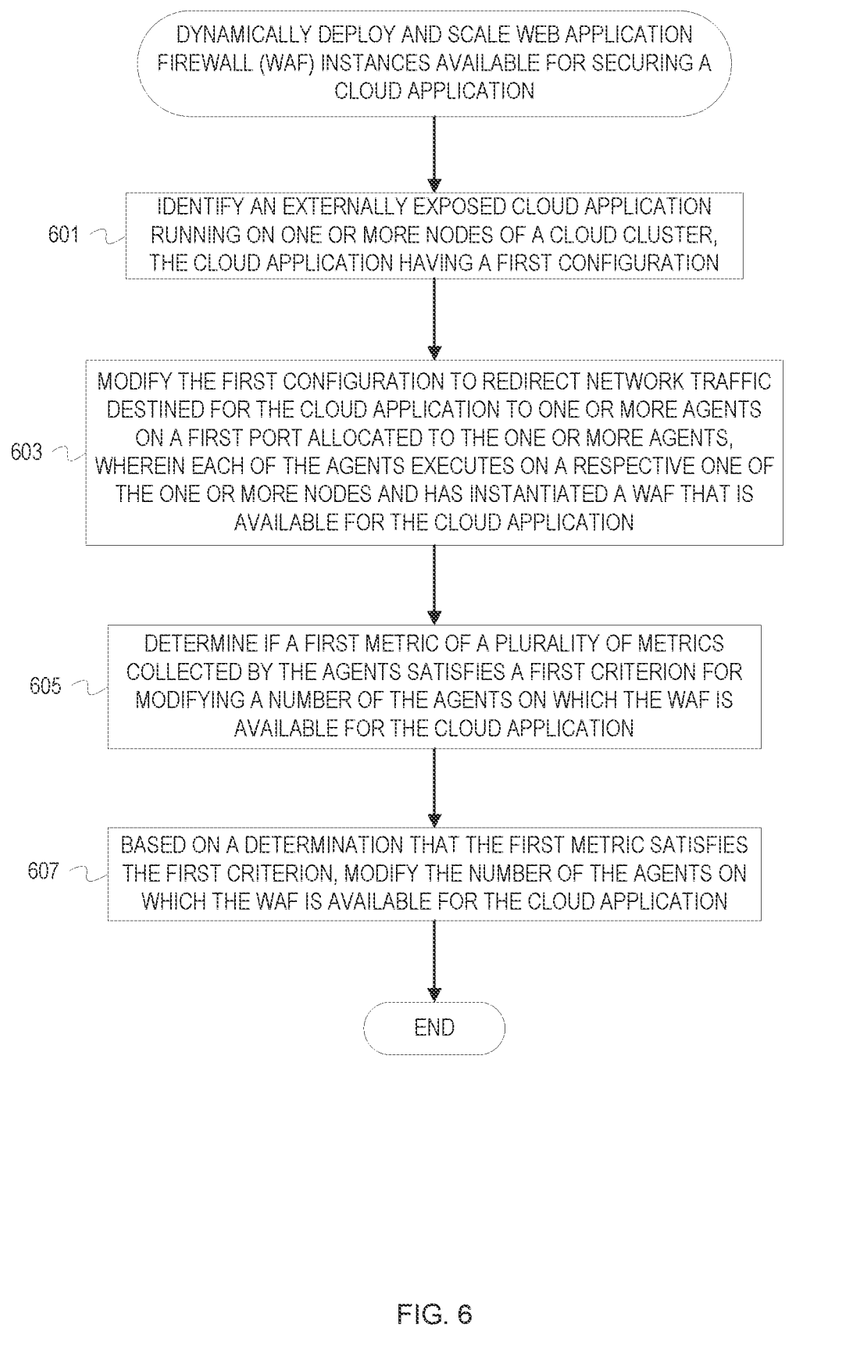
FIG. 6 depicts a flowchart of example operations for dynamically deploying and scaling WAF instances available for securing a cloud application.
Figure 7:
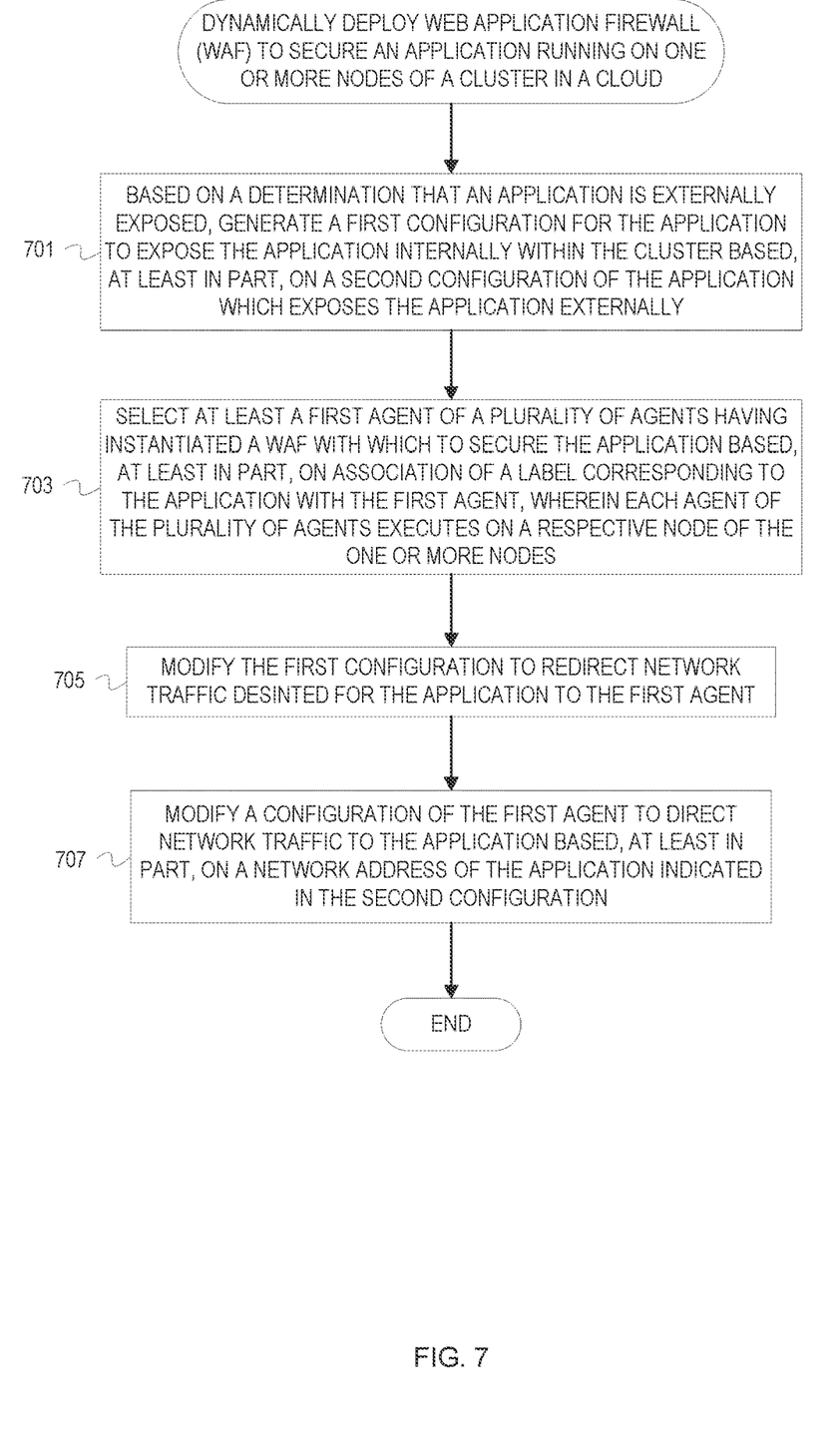
FIG. 7 depicts a flowchart of example operations for dynamically deploying a WAF to secure an application running on one or more nodes of a cluster in a cloud.
Figure 8:
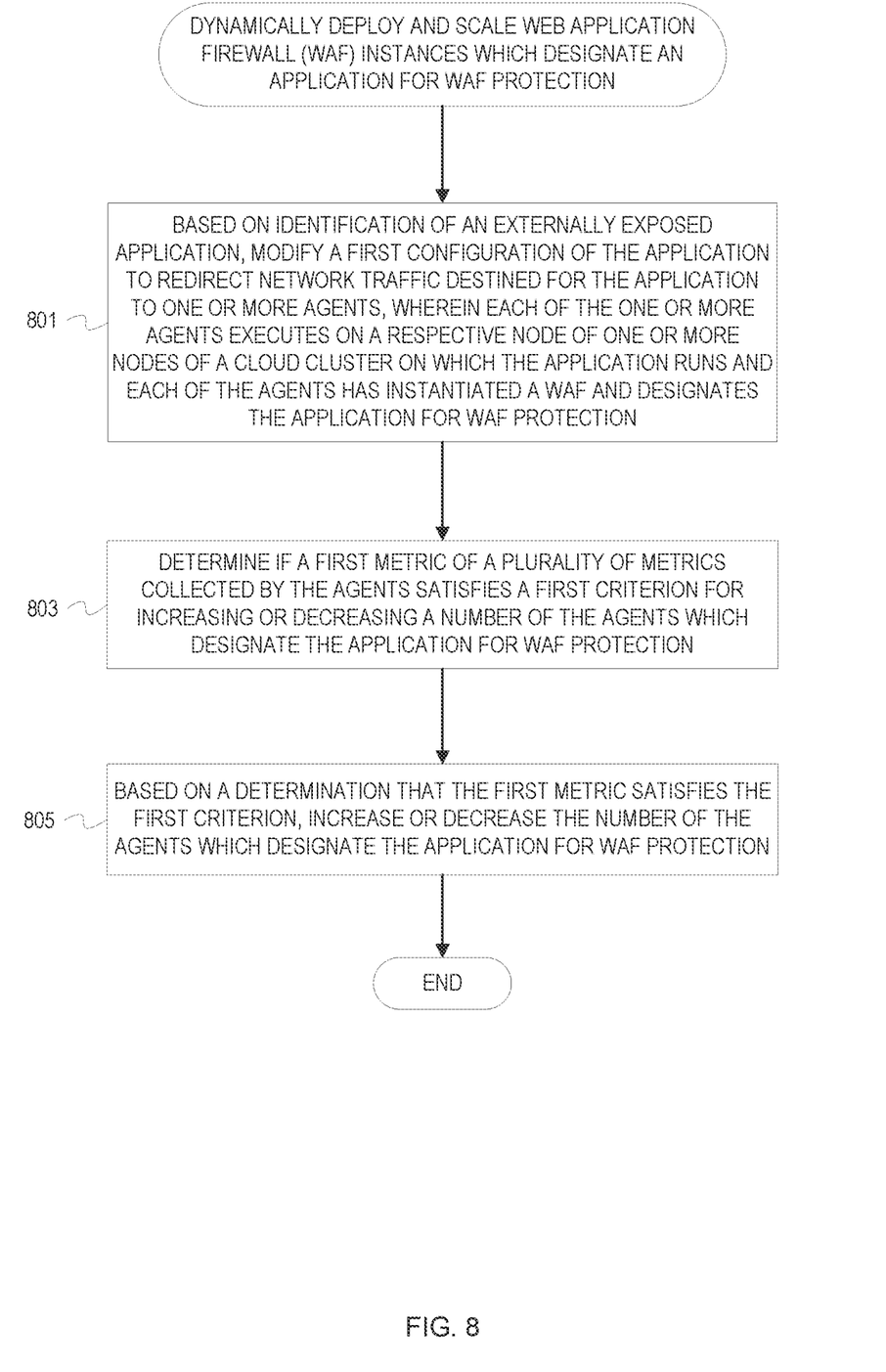
FIG. 8 depicts a flowchart of example operations for dynamically deploying and scaling WAF instances which designate an application for WAF protection.

FIGS. 6-8 are flowcharts that describe the innovative technology in broader/different terminology as an attempt to account for the shortcomings of language to describe novel technology. These flowcharts do not refer to a specific actor since there are numerous implementations for organizing and developing program code, as well as various choices for deployment on different hardware and/or virtualization.

FIG. 6 depicts a flowchart of example operations for dynamically deploying and scaling WAF instances available for securing a cloud application. At block 601, an externally exposed cloud application running on one or more nodes of a cloud cluster is identified. The cloud application has a first configuration.

At block 603, the first configuration is modified to redirect network traffic destined for the cloud application to one or more agents on a first port allocated to the one or more agents. Each of the agents executes on a respective one of the one or more nodes and has instantiated a WAF that is available for the cloud application. A label which designates the cloud application can be associated with containers of at least a subset of the agents, where the labelling of the subset of agents designates that the WAF instantiated on each of the subset of agents is available for the cloud application. At block 605, it is determined if a first metric of a plurality of metrics collected by the agents satisfies a first criterion for modifying a number of the agents on which the WAF is available for the cloud application.

At block 607, based on a determination that the first metric satisfies the first criterion, the number of agents on which the WAF is available for the cloud application is modified. The number of agents can be modified through associating the label which designates the cloud application with a container of an agent in addition to the subset of agents to increase the number of agents or removing the label from at least a first of the containers of the subset of agents to decrease the number of agents. Alternatively or in addition, the number of agents can be modified by adding a node to the cluster on which an agent is deployed and labelled to designate the application to increase the number of agents or changing a status of a first of the one or more nodes from active to idle to decrease the number of agents.

FIG. 7 depicts a flowchart of example operations for dynamically deploying a WAF to secure an application running on one or more nodes of a cluster in a cloud. At block 701, based on a determination that an application is externally exposed, a first configuration is generated for the application to expose the application internally within the cluster. The first configuration is generated based, at least in part, on a second configuration of the application which exposes the application externally. The first configuration can comprise a public network address that has been allocated to the application. The second configuration can be generated based on copying the first configuration and replacing the public network address with a private network address allocated to the application.

At block 703, at least a first agent of a plurality of agents having instantiated a WAF with which to secure the application is selected based, at least in part, on association of a label corresponding to the application with the first agent. Each agent of the plurality of agents executes on a respective node of the one or more nodes. At block 705, the first configuration is modified to redirect network traffic destined for the application to the first agent. The first configuration can be modified to indicate a first port allocated for a network address associated with the plurality of agents and the label as a destination for external network traffic. At block 707, a configuration of the first agent is modified to direct network traffic to the application based, at least in part, on a network address of the application indicated in the second configuration. The configuration of the first agent can be modified to indicate the private network address of the application indicated in the second configuration.

FIG. 8 depicts a flowchart of example operations for dynamically deploying and scaling WAF instances which designate an application for WAF protection. At block 801, based on identification of an externally exposed application, a first configuration of the application is modified to redirect network traffic destined for the application to one or more agents. Each of the one or more agents executes on a respective node of one or more nodes of a cloud cluster on which the application runs. Each of the agents also has instantiated a WAF and designates the application for WAF protection. At least a subset of the agents can be labelled with a label corresponding to the application, where the labelling of the subset of agents designates the application for WAF protection by the subset of agents.

At block 803, it is determined if a first metric of a plurality of metrics collected by the agents satisfies a first criterion for increasing or decreasing a number of the agents which designate the application for WAF protection. The determination of whether the first metric satisfies the first criterion can be based on whether the first metric exceeds a maximum value of the first metric and/or is below a minimum value of the first metric. At block 805, based on a determination that the first metric satisfies the first criterion, the number of the agents which designate the application for WAF protection is increased or decreased. The number of agents which designate the application for WAF protection can be increased based, at least in part, on labelling at least a first agent in addition to the subset of agents with the label corresponding to the application. The number of agents which designate the application for WAF protection can be decreased based, at least in part, on removing the label corresponding to the application from at least a first agent of the subset of agents.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 307 and 309 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 9:
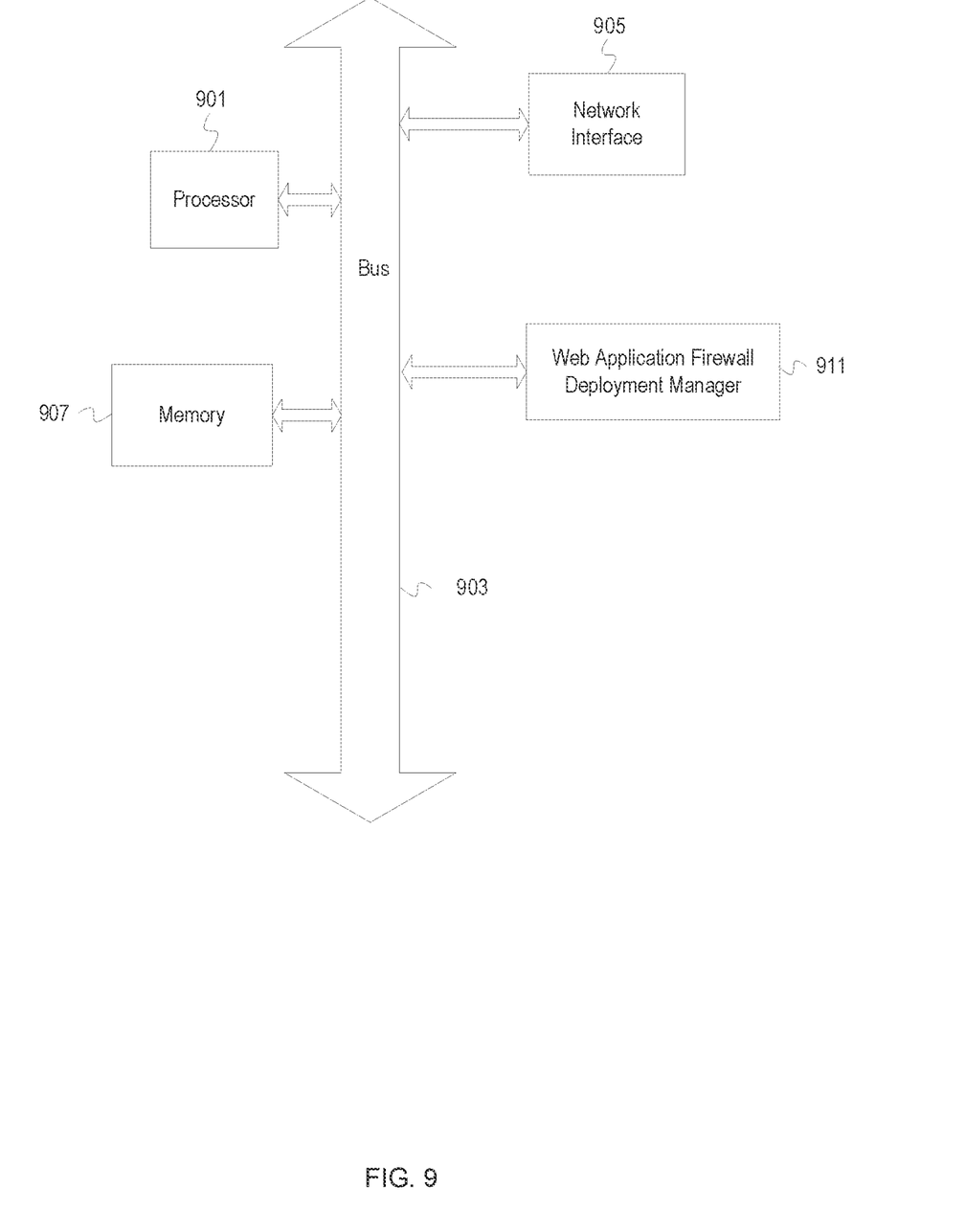
FIG. 9 depicts an example computer system with a WAF deployment manager.

FIG. 9 depicts an example computer system with a WAF deployment manager. The computer system includes a processor 901 (possibly including multiple processors, multiple cores, multiple nodes, and/or implementing multi-threading, etc.). The computer system includes memory 907. The memory 907 may be system memory or any one or more of the above already described possible realizations of machine-readable media. The computer system also includes a bus 903 and a network interface 905. The system also includes WAF deployment manager 911. The WAF deployment manager 911 manages dynamic WAF deployment and scaling across one or more nodes of a cloud cluster as described herein. Any one of the previously described functionalities may be partially (or entirely) implemented in hardware and/or on the processor 901. For example, the functionality may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 907 may be coupled to the processor 901.

While the aspects of the disclosure are described with reference to various implementations and exploitations, it will be understood that these aspects are illustrative and that the scope of the claims is not limited to them. In general, techniques for dynamically scalable WAF deployment as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. The term "cloud destination" and "cloud source" refer to an entity that has a network address that can be used as an endpoint for a network connection. The entity may be a physical device (e.g., a server) or may be a virtual entity (e.g., virtual server or virtual storage device). In more general terms, a cloud service provider resource accessible to customers is a resource owned/manage by the cloud service provider entity that is accessible via network connections. Often, the access is in accordance with an application programming interface or software development kit provided by the cloud service provider.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
    identifying a cloud application running on one or more nodes of a cloud cluster that is externally exposed, the cloud application having a first configuration, wherein one or more agents execute on respective ones of the one or more nodes and is associated with respective ones of one or more containers;
    modifying the first configuration to redirect network traffic destined for the cloud application to the agents on a first port allocated to the agents for the cloud application, wherein each of the agents has instantiated a web application firewall, wherein the web application firewall is made available for the cloud application based on labelling of those of the containers of at least a subset of the agents with a label that designates the cloud application;
    determining if a number of the agents on which the web application firewall is made available to the cloud application should be increased or decreased based on determining if a first metric of a plurality of metrics collected by the agents satisfies a first criterion for modifying a number of the agents on which the web application firewall is available for the cloud application, wherein the first criterion indicates a threshold;
    based on determining that the number of the agents should be increased, increasing the number of the agents based on associating the label with one of the containers in addition to those of the subset of the agents; and
    based on determining that the number of the agents should be decreased, decreasing the number of the agents based on removing the label from one of those of the containers of the subset of the agents.

2. The method of claim 1, wherein the threshold corresponds to a maximum value of the first metric, wherein determining if the first metric satisfies the first criterion comprises determining if the first metric exceeds the threshold, and wherein determining that the number of the agents should be increased comprises determining that the first metric exceeds the threshold.

3. The method of claim 1, wherein the threshold corresponds to a minimum value of the first metric, wherein determining if the first metric satisfies the first criterion comprises determining if the first metric is below the threshold, and wherein determining that the number of the agents should be decreased comprises determining that the first metric is below the threshold.

4. The method of claim 1, further comprising generating a second configuration for the cloud application to expose the cloud application internally within the cloud cluster with a private network address based, at least in part, on the first configuration.

5. The method of claim 4, wherein generating the second configuration comprises copying the first configuration and replacing a public network address of the cloud application with a private network address allocated to the cloud application.

6. The method of claim 4, further comprising modifying a configuration of the agents to direct network traffic allowed to pass by the web application firewall to the cloud application via the private network address of the cloud application.

7. The method of claim 1, wherein increasing the number of the agents further comprises adding to the cloud cluster a node having deployed an additional agent, wherein associating the label with the one of the containers in addition to those of the subset of the agents comprises associating the label with a container of the additional agent.

8. The method of claim 1, wherein decreasing the number of the agents further comprises changing a status of a first of the one or more nodes from active to idle.

9. The method of claim 1 further comprising, based on identifying a second cloud application running on the one or more nodes that is externally exposed, modifying a configuration of the second cloud application to redirect network traffic destined for the second cloud application to the one or more agents on a second port allocated to the one or more agents, wherein the second port is different than the first port.

10. The method of claim 1, wherein the plurality of metrics comprises metrics indicating at least one of memory usage of each of the one or more nodes, central processing unit (CPU) usage of each of the one or more nodes, and an amount of network traffic directed to the cloud application.

11. One or more non-transitory machine-readable media comprising program code for dynamically deploying a web application firewall to secure an application running on a plurality of nodes of a cluster in a cloud, the program code to:
    based on a determination that the application is externally exposed, generate a first configuration for the application to expose the application internally within the cluster based, at least in part, on a second configuration of the application which exposes the application externally;
    select at least a first agent of a plurality of agents having instantiated a web application firewall with which to secure the application based, at least in part, on labelling of a first container of the first agent with a label corresponding to the application, wherein each agent of the plurality of agents executes on a respective node of the plurality of nodes, and wherein labelling the first container of the first agent makes the web application firewall available to the application;
    modify the first configuration to redirect network traffic destined for the application to the first agent;
    modify a configuration of the first agent to direct network traffic to the application based, at least in part, on a network address of the application indicated in the second configuration;
    determine whether to increase or decrease a number of the agents having instantiated the web application firewall with which to secure the application based, at least in part, on evaluation of metrics collected by the plurality of agents against one or more criteria indicating one or more thresholds for the metrics;

based on a determination that the number of the agents is to be increased, label at least a second container of a second agent of the plurality of agents with the label; and based on a determination that the number of the agents is to be decreased, remove the label from the first container of the first agent.

12. The non-transitory machine-readable media of claim 11, further comprising program code to allocate a first port for a network address associated with the plurality of agents, wherein the program code to modify the first configuration comprises program code to modify the first configuration to indicate the first port and the label as a destination for external network traffic.

13. The non-transitory machine-readable media of claim 11, wherein the first configuration comprises a public network address allocated to the application, wherein the program code to generate the second configuration comprises program code to copy the first configuration and replace the public network address with a private network address allocated to the application, and wherein the program code to modify the configuration of the first agent comprises program code to modify the configuration to indicate the private network address of the application.

14. An apparatus comprising:

a processor; and a computer-readable medium having instructions stored thereon that are executable by the processor to cause the apparatus to, based on identification of an application running on a cloud cluster that is externally exposed, modify a first configuration of the application to redirect network traffic destined for the application to one or more agents, wherein each of the one or more agents executes on a respective node of one or more nodes of the cloud cluster in a respective container of one or more containers, wherein each of the agents has instantiated a web application firewall, wherein the web application firewall is available for protection of the application via labelling of those of the containers of at least a subset of the agents with a label that corresponds to the application;

determine if a first metric of a plurality of metrics collected by the agents satisfies a first criterion for increasing or decreasing a number of the agents which designate the application for web application firewall protection based on evaluation of the first metric against at least a first threshold indicated by the first criterion;

based on a determination that the first metric exceeds the first threshold, increase the number of the agents which designate the application for web application firewall protection based on association of the label that corresponds to the application to an additional one of the containers of the agents; and based on a determination that the first metric is below the first threshold, decrease the number of the agents which designate the application for web application firewall protection based on removal of the label from a first of the containers of the subset of the agents.

15. The apparatus of claim 14, further comprising instructions executable by the processor to cause the apparatus to, generate a second configuration for the application to expose the application internally within the cloud cluster with a private network address allocated to the application based, at least in part, on the first configuration; and modify a configuration of the agents to direct network traffic to the application via the private network address of the application.

16. The apparatus of claim 14, wherein the instructions executable by the processor to cause the apparatus to modify the first configuration of the application comprise instructions executable by the processor to cause the apparatus to modify the first configuration to redirect network traffic destined for the application to the agents on a first port allocated to the agents for the application.

17. The apparatus of claim 16 further comprising instructions executable by the processor to cause the apparatus to, based on identification of a second application running on the one or more nodes that is externally exposed, modify a second configuration of the second application to redirect network traffic destined for the second application to the agents on a second port allocated to the agents for the second application, wherein the second port is different than the first port.

18. The non-transitory machine-readable media of claim 11, wherein the metrics indicate at least one of memory usage of each of the plurality of nodes, central processing unit (CPU) usage of each of the plurality of nodes, and an amount of network traffic directed to the application.

19. The apparatus of claim 14, wherein the first threshold corresponds to a maximum value of the first metric, and wherein the instructions executable by the processor to cause the apparatus to evaluate the first metric against the first threshold comprise instructions executable by the processor to cause the apparatus to determine if the first metric exceeds the first threshold.

20. The apparatus of claim 14, wherein the first threshold corresponds to a minimum value of the first metric, wherein the instructions executable by the processor to cause the apparatus to evaluate the first metric against the first threshold comprise instructions executable by the processor to cause the apparatus to determine if the first metric is below the first threshold.

\* \* \* \* \*